No. 820,742. PATENTED MAY 15, 1906.
C. J. SISK.
MOTOR SLEIGH.
APPLICATION FILED JULY 11, 1905.
2 SHEETS—SHEET 1.
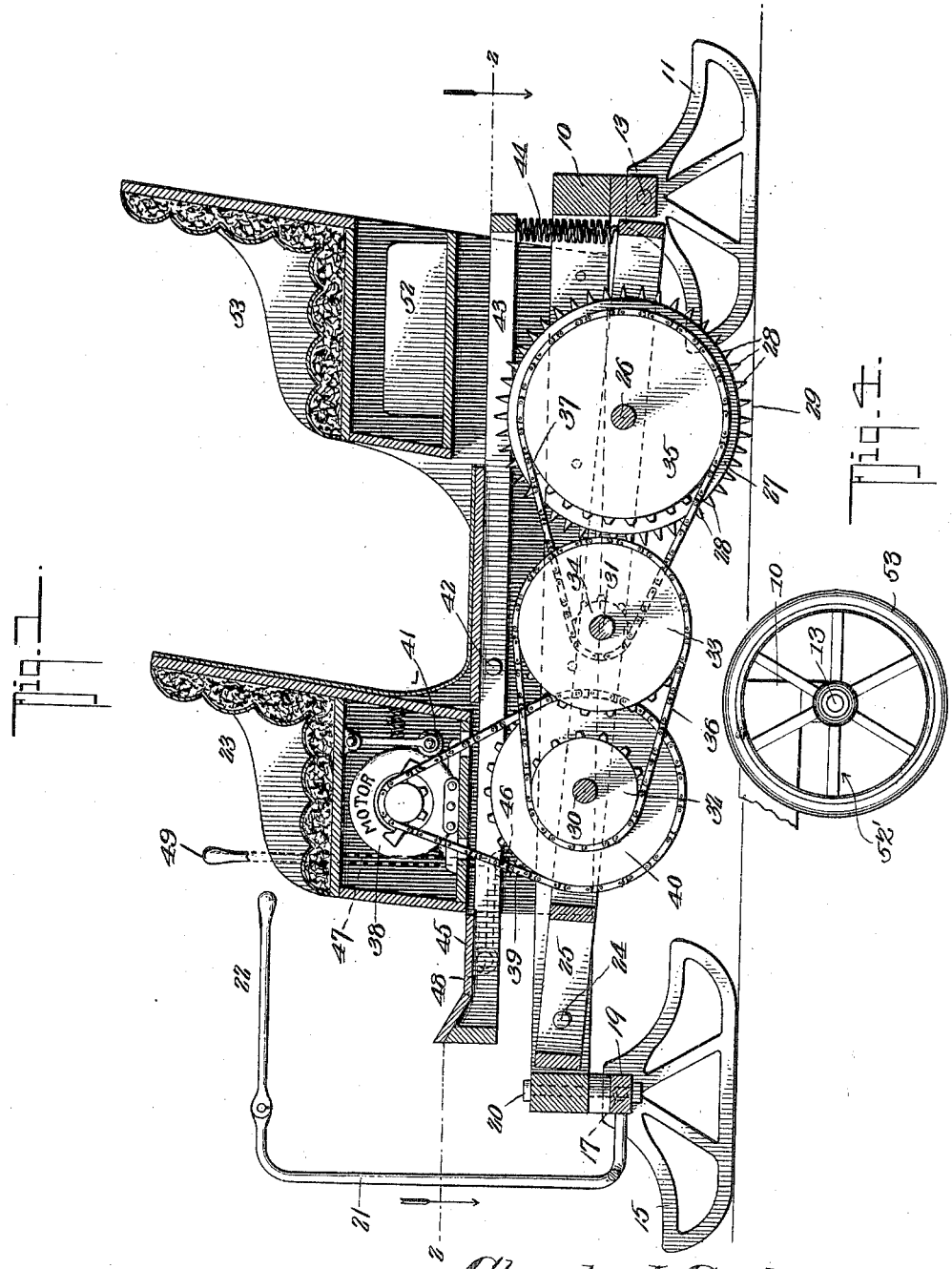
Witnesses
E. F. Stewart
C. N. Woodward
Claude J. Sisk, Inventor.
by C. A. Snow & Co.
Attorneys

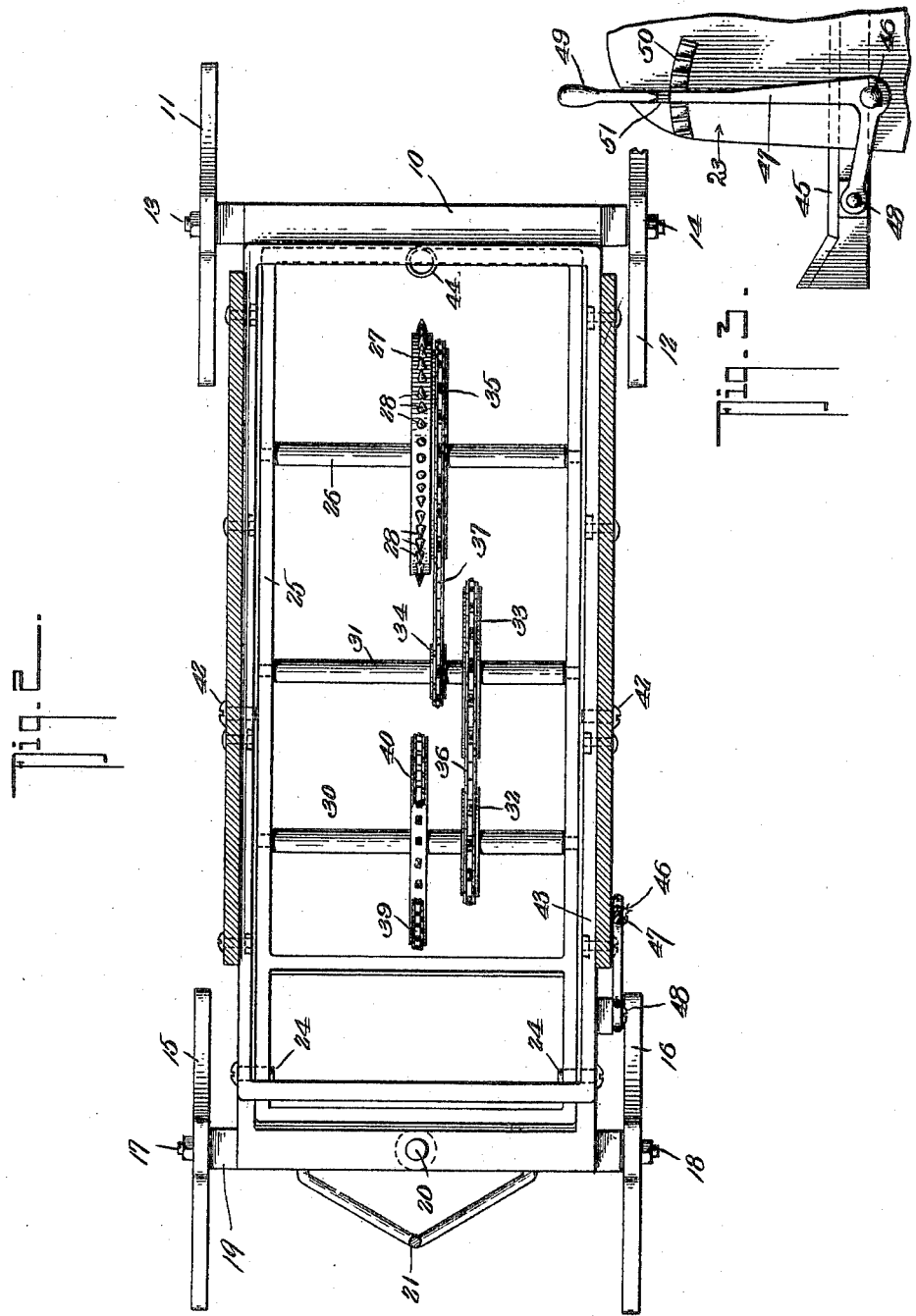

UNITED STATES PATENT OFFICE.

CLAUDE JACKSON SISK, OF HOPKINSVILLE, KENTUCKY.

MOTOR-SLEIGH.

No. 820,742.  Specification of Letters Patent.  Patented May 15, 1906.

Application filed July 11, 1905. Serial No. 269,221.

*To all whom it may concern:*

Be it known that I, CLAUDE JACKSON SISK, a citizen of the United States, residing at Hopkinsville, in the county of Christian and State of Kentucky, have invented a new and useful Motor-Sleigh, of which the following is a specification.

This invention relates to motor-sleighs and similar vehicles, and has for its object to improve and simplify the construction and increase the efficiency and utility of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a longitudinal sectional elevation of the improved apparatus. Fig. 2 is a plan view in section on the line 2 2 of Fig. 1. Fig. 3 is a detail of the shifter-lever mechanism. Fig. 4 represents one of a set of wheels which may be employed in place of runners, if required.

The improved device comprises a main frame 10 of any desired size, preferably rectangular, and of the shape and size of an ordinary vehicle and provided with sleigh-runners, the rear runners 11 12 being pivoted, as at 13 14, to the rear end, and the forward runners 15 16 pivoted at 17 18 to a bolster 19, swinging at 20 to the forward end of the main frame. The bolster member 19 is provided with a steering-bar 21, extending rearwardly and terminating in a handle 22, convenient to the operator on the forward seat 23. Pivoted at 24 at the forward end of the main frame 10 is a supporting-frame 25, extending rearwardly for swinging vertically within the main frame. A main shaft 26 is mounted for rotation in the swinging frame 25, and mounted upon this shaft is a traction-wheel 27, preferably formed with spurs 28 in its periphery for bearing upon the ice or snow (indicated at 29) when the frame 25 is depressed. Spaced shafts 30 31 are mounted for rotation in the swinging frame 25 and provided with chain-pulleys 32 33 34, while the shaft 26 is provided with a chain-pulley 35, the pulleys 32 33 being connected by a chain 36 and the pulleys 34 and 35 connected by a chain 37.

Supported upon the main frame 10, preferably beneath the forward seat 23, is a motor, (represented at 38,) said motor being connected by a drive-chain 39 to a chain-pulley 40 on the shaft 30. By this means it is obvious that the rotary motion of the motor 38 will be imparted to the traction-wheel 27 and the vehicle propelled thereby. A movably-connected idler-pulley 41 is arranged for taking up the slack of the chain 39 when the frame 25 is actuated.

Pivoted at 42 to the main frame 10 is a shifter-frame 43, connected at one end to the free end of the supporting-frame 25 by a resilient element, such as a coiled spring 44, and with the other end extending beneath the seat 23 and provided with a foot-rest 45 in advance of the seat. Pivoted at 46 to the side of the main frame 10 is a lever 47, coupled, as at 48, at one end to the shifter-frame 43 and extending upwardly and terminating in a handle 49 in convenient position for the occupant of the seat 23. A toothed segment 50 will preferably be attached to the side of the seat 23 to receive a pawl on the lever (the latter indicated at 51) to enable the lever to be held at any desired point of adjustment. By this arrangement it will be obvious that when the lever 47 is pushed forward the shifter-frame 43 will be depressed at the forward end and elevated at the rear end and carry the frame 25 with it by reason of the coupling member 44, and thus raise the traction-wheel from the ice, and when this action takes place the operator naturally throws a portion of his weight upon the foot-rest and materially aids the action, as will be obvious.

The battery which furnishes the power is represented at 52 under the rear seat 53; but the connecting-wiring is not shown, as the motor and battery form no part of the present invention.

The frames 10, 25 and 43 may be of any required material and any required size.

If required, the runners may be replaced with wheels, one of which is represented at 52' in Fig. 4, and preferably with rubber or similar tire, as at 53'.

Having thus described my invention, what is claimed is—

1. In a vehicle of the class described, a main frame mounted upon bearing members, a supporting-frame swinging from said main frame, a traction-wheel mounted for rotation in said swinging frame for bearing on the ground, means carried by said main frame for rotating said wheel, a shifter-frame pivoted to the main frame at a point intermediate its ends, a yieldable element interposed between the movable end of said supporting-frame and the adjacent end of the shifter-frame, and means under the control of the operator for actuating said shifter-frame.

2. In a vehicle of the class described, a main frame mounted upon bearing members with a seat for the operator at the forward end, a supporting-frame swinging from said main frame, a traction-wheel mounted for rotation in said swinging frame for bearing on the ground, means carried by said main frame for rotating said wheel, a shifter-frame swinging from said main frame and extending at one end beneath said seat, a footboard carried by said shifter-frame in advance of said seat, a yieldable element between said shifter-frame and the movable end of said supporting-frame, and means under the control of the operator for actuating said shifter-frame.

3. In a vehicle of the class described, a main frame mounted upon bearing members with a seat for the operator at the forward end, a supporting-frame swinging from said main frame, a traction-wheel mounted for rotation in said swinging frame for bearing on the ground, means carried by said main frame for rotating said wheel, a shifter-frame swinging from said main frame and extending at one end beneath said seat, a footboard carried by said shifter-frame in advance of said seat, a yieldable element between said shifter-frame and the movable end of said supporting-frame, a lever-arm movably connected to said main frame and coupled by its shorter end to said shifter-frame and with its longer end terminating in a handle, a pawl carried by said lever, and a toothed segment for adjustable engagement by said pawl, whereby the shifter-frame is supported in any required position.

In testimony that I claim the foregoing as my own I have hereto affixed my signature in the presence of two witnesses.

CLAUDE JACKSON SISK.

Witnesses:
  GEO. U. LONG,
  W. H. FYKE, Jr.